United States Patent [19]

Watanabe et al.

[11] 4,287,229
[45] Sep. 1, 1981

[54] METHOD FOR SURFACE TREATMENT OF PHOSPHOR PARTICLES

[75] Inventors: Minoru Watanabe, Tokyo; Mitsuhiro Oikawa, Kawasaki; Toshio Nishimura; Masao Asada, both of Yokohama; Masao Tezuka, Tokyo; Tsurahide Cho, Kawasaki, all of Japan

[73] Assignee: Tokyo Shibaura Denki Kabushikikaisha, Kawasaki, Japan

[21] Appl. No.: 90,922

[22] Filed: Nov. 5, 1979

[30] Foreign Application Priority Data

Nov. 9, 1978 [JP] Japan .................... 53/137365

[51] Int. Cl.$^3$ .............................................. H01J 29/26
[52] U.S. Cl. .......................................... 427/64; 427/68; 252/301.6 R; 428/404
[58] Field of Search ............... 252/301.6 R, 301.6 S; 427/64, 68; 428/404

[56] References Cited

U.S. PATENT DOCUMENTS 3,684,731 8/1972 Feg .............................. 252/301.6 S
4,128,674 12/1978 Hedler ............................. 427/218

FOREIGN PATENT DOCUMENTS 447823 4/1948 Canada ........................... 252/301.6 S Primary Examiner—Sam Silverberg
Attorney, Agent, or Firm—Cushman, Darby & Cushman

[57] ABSTRACT

Disclosed is a method for surface treatment of phosphor particles which comprises forming a continuous film of silicon dioxide on the surface of each phosphor particle by treating the phosphor particle with a solution containing an aqueous solution of organic alkali and silicon dioxide dissolved therein.

6 Claims, 5 Drawing Figures

METHOD FOR SURFACE TREATMENT OF PHOSPHOR PARTICLES

This invention relates to a method for surface treatment of phosphor particles, more specifically phosphor particles used for color cathode ray tubes and other cathode ray tubes, fluorescent lamps, etc.

Phosphors available for color picture tubes and other cathode ray tubes, as well as for fluorescent lamps, are formed of particles with particle diameters of about 3 to 15μ, and are required to exhibit good dispersibility.

In a conventional manufacturing process, such phosphors are subjected to firing and particle forming processes, and normally washed with pure water to clean the surface of particles for use. In doing this, however, the individual phosphor particles are liable to cohere again, and hence be dried, so that they cannot help being poor in fluidity. When dispersing phosphor particles in pure water or a slurry for fluorescent screen formation, moreover, cohesion may be noticed not only in the recondensed phosphor particles but also in particles that enjoy good fluidity when dried. Therefore, it is conventionally difficult to obtain uniform and high-density phosphor films.

As a means for removing such cohesion of the phosphor particles, there has hitherto been used a method to stick on the surface of the phosphor particles as silicate such as zinc silicate, phosphate such as aluminum phosphate, or fine powders of $SiO_2$ as stated in Japanese Patent Publication No. 35425/71 for example.

However, such surface treatment method is not always satisfactory. Especially with phosphors of e.g. zinc sulfate system including relatively large-sized particles (6 to 10μ) that have recently come into use for color picture tubes, the prior art treatment method would provide only low density of phosphor screen and unsatisfactory formation of stripe-shaped phosphors layer by photo-etching. Further, like nontreated phosphors, the phosphors treated by such method are subject to a reduction in luminous efficiency during a baking process for the formation of phosphor screen, constituting a hindrance to the improvement of luminance. The deterioration during the baking process is also found in phosphors such as Sb, Mn-activated halo-phosphate available for fluorescent lamps.

The object of this invention is to provide a method for surface treatment of phosphor particles capable of improving liquid dispersibility and brightness of the phosphor particles.

According to this invention, there is provided a method for surface treatment of phosphor particles which comprises forming a continuous film of silicon dioxide on the surface of each phosphor particle by treating the phosphor particle with a solution containing an aqueous solution of organic alkali and silicon dioxide dissolved therein.

The organic alkali used may include choline, i.e. $[HOCH_2CH_2N(CH_3)_3]^+OH^-$; tetramethylammonium hydroxide, i.e. $[N(CH_3)_4]^+OH^-$; tetraethylammonium hydroxide, i.e. $[N(C_2H_5)_4]^+OH^-$; tetrapropylammonium hydroxide, i.e. $[N(C_3H_7)_4]^+OH^-$; tetrabutylammonium hydroxide, i.e. $[N(C_4H_9)_4]^+OH^-$; tributylmonoethylammonium hydroxide, i.e. $[C_2H_5N(C_4H_9)_3]^+OH^-$; trimethylmonooctylammonium hydroxide, i.e. $[(CH_3)_3NC_8H_{17}]^+OH^-$; and triethylmonophenylammonium hydroxide, i.e. $[(C_2H_5)_3NC_6H_5]^+OH^-$.

This invention can be more fully understood from the following detailed description when taken in conjunction with the accompanying drawings, in which.

Figure 1:
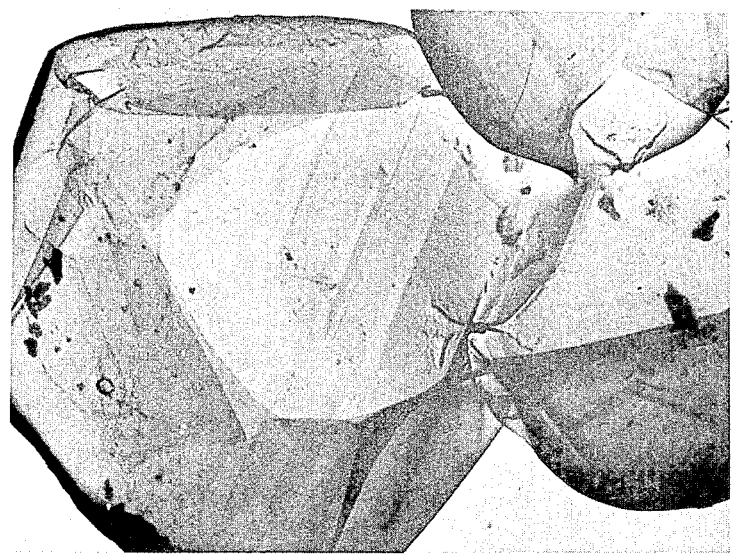
FIG. 1 is a photomicrograph of a phosphor particle treated by the method of this invention.
Figure 2:
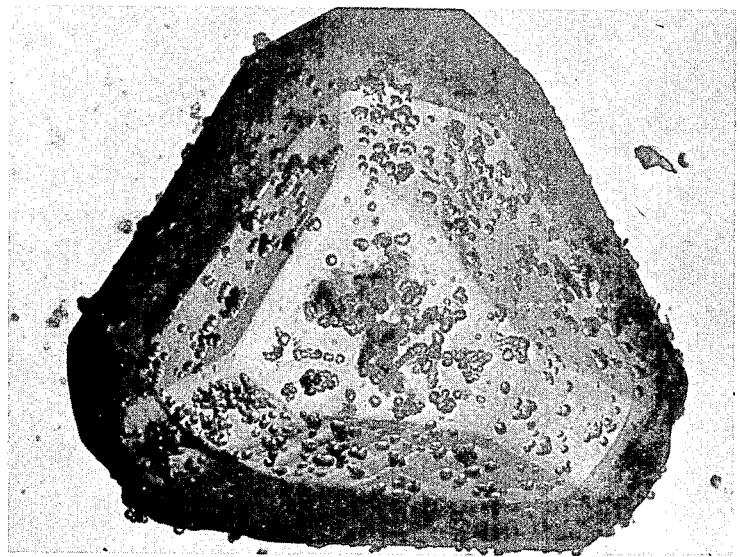
FIG. 2 is a photomicrograph of a phosphor particle treated by the prior art method.

A phosphor treated by the method of this invention has its each individual particle coated substantially entirely with $SiO_2$, so that it can enjoy highly satisfactory dispersibility in liquid. A phosphor particle coated by such method is shown in a photomicrograph (×20,000) of FIG. 1. It may be seen from FIG. 1 that the particle is coated with a continuous film as compared with $SiO_2$ powders stuck on a phosphor particle by a prior art method as shown in a photomicrograph (×20,000) of FIG. 2. Small projections of FIG. 2 are the $SiO_2$ powders. The phosphor particle with such continuous $SiO_2$ film, as mentioned later in connection with several examples, undergoes quite a moderate reduction in luminous efficiency attributable to baking process, as compared with a substantial reduction for the particle treated by the prior art method.

Figure 3:
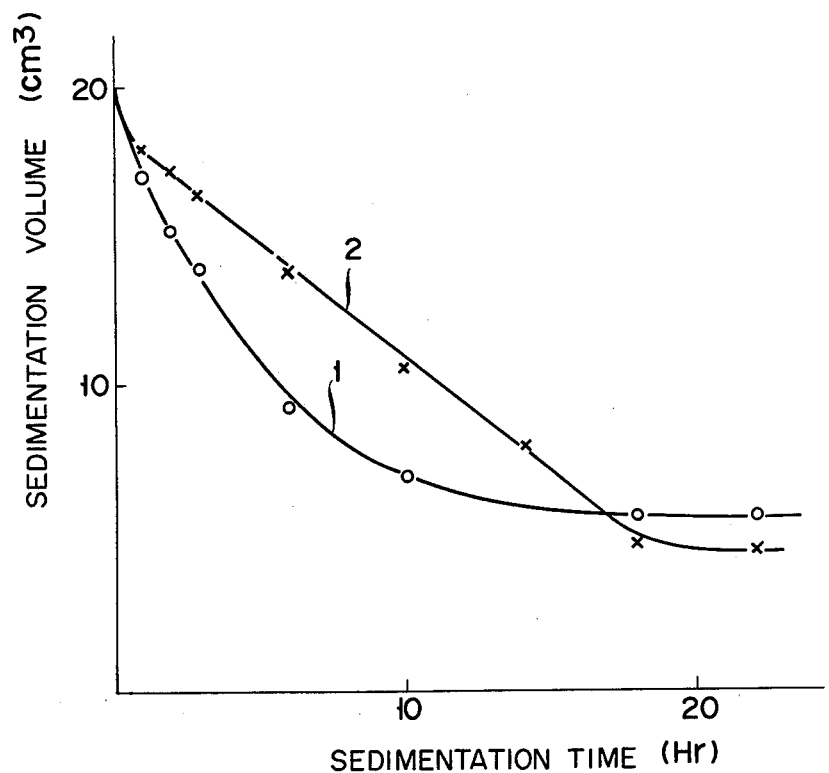
FIG. 3 is a graph showing the relationship between the sedimentation time and sedimentation volume of phosphor particles.

Referring now to FIG. 3, there will be described the sedimentation volume change of phosphor particles in a slurry which is formed by mixing the phosphor particles of FIG. 1 with a composition containing PVA (polyvinyl alcohol), pure water, surface active agent and sensitizer, and is fully stirred.

In the graph of FIG. 3, the axis of abscissa represents the sedimentation time (hr), while the axis of ordinate represents the sedimentation volume ($cm^3$). Curve (1) connecting circles (o) is given for the phosphor particle of FIG. 2 which is coated with $SiO_2$ powders by the prior art method, while curve (2) connecting crosses (x) is given for the phosphor particle of FIG. 1 which is coated by the method of this invention. As is evident from FIG. 3, the phosphor treated by the method of the invention exhibits low sedimentation velocity which varies substantially rectilinearly, that is, high dispersibility.

Figure 4:
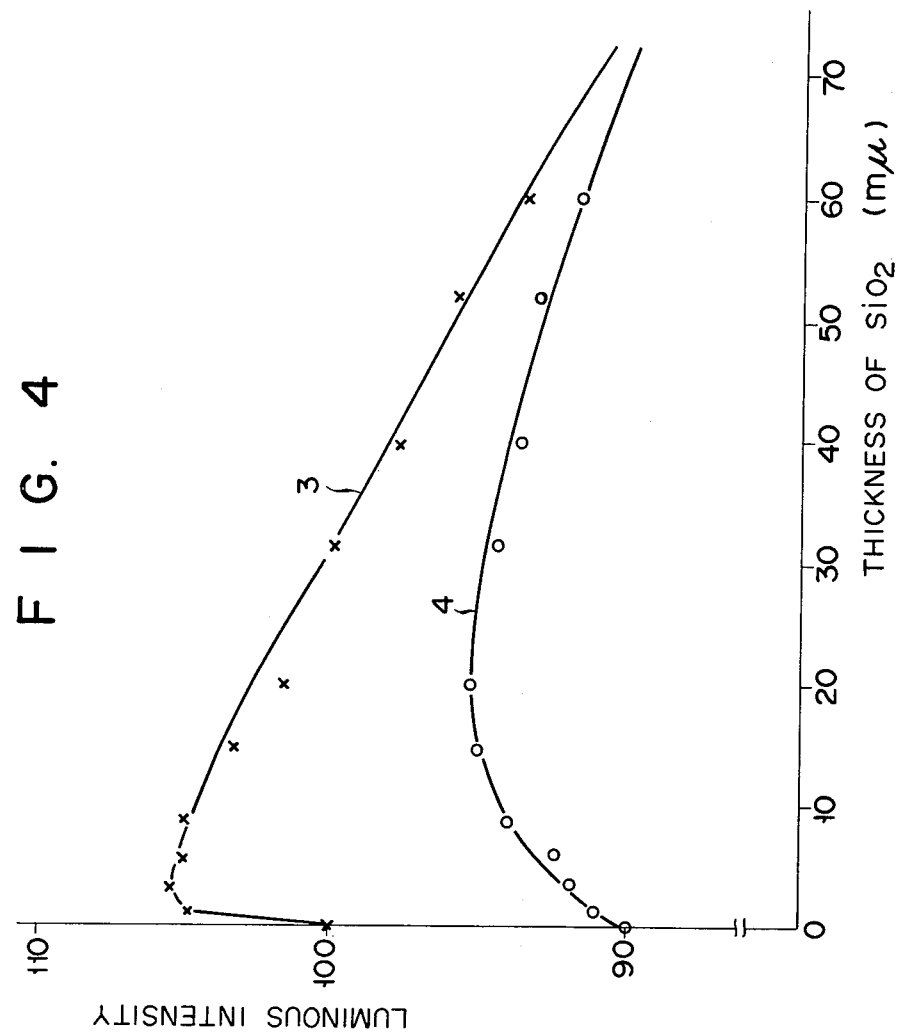
FIG. 4 is a graph showing the relationship between the thickness of an $SiO_2$ film formed on the surface of a phosphor particle and the luminous intensity.

In FIG. 4 showing the relationship between the thickness (mμ) of the $SiO_2$ films on the phosphor particles treated by the method of the invention and the luminous intensity, curve (3) connecting crosses (x) is given for particles prior to the baking process, while curve (4) connecting circles (o) is given for particles after baking. As may be seen from FIG. 4, the luminous intensity is increased by several percent and deterioration due to the baking process is substantially reduced by forming a continuous $SiO_2$ film with a desired thickness. The proper quantity of the continuous $SiO_2$ films used may range from 0.02 to 4.0% (by weight) of the quantity of phosphor particles with an average particle diameter of approximately 6.5μ. Thus, the film thickness ranges from 0.5 to 70 mμ, preferably from 1 to 40 mμ. These ranges may, however, vary with the particle diameter.

Figure 5:
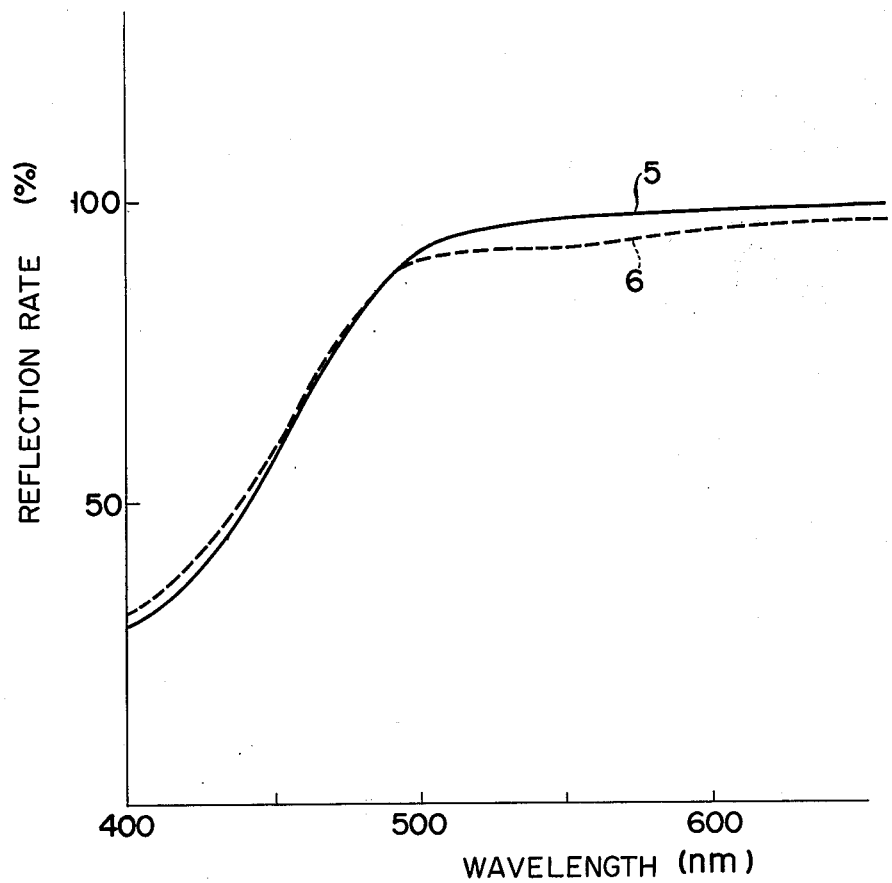
FIG. 5 is a graph showing the relationship between the wavelength and reflection rate of light emitted from phosphor.

As one of the reasons for the increase of the luminous intensity of the phosphor particles with the continuous $SiO_2$ films, there may be given a reduction of optical loss of the phosphor surface. In order to prove this, the inventors hereof obtained curves of FIG. 5 which show the relationship between the wavelength (nm) and reflection rate for the phosphor with the continuous $SiO_2$ film of the invention (full line 5) and for the prior art phosphor without the continuous $SiO_2$ film (broken line 6), with use of ZnS/Cu, Au, Al as the phosphor. As is evident from FIG. 5, the reflection rate of the phosphor is improved by 3 to 4% as compared with the value for the prior art phosphor in the wavelength range above 500 nm, exerting a favorable influence upon the luminous intensity.

The reduction in the lowering of the luminance due to the baking of the fluorescent screen, which is hardly effected by the prior art phosphor treated with $SiO_2$ powders (FIG. 2) or coated with zinc silicate, can be achieved since the phosphor is entirely covered with the $SiO_2$ films. The method of this invention is applicable not only to the phosphor for color picture tubes but also to phosphors such as calcium halo-phosphate, $3Ca_3(PO_4)_2 \cdot CaFCl/Sb$, Mn, used for e.g. fluorescent lamps for illumination and $Sr_2P_2O_7/Sn$ that is particularly unstable against the baking process.

EXAMPLE 1

Green light emitting phosphor particles, ZnS/Cu, Au, Al, available for color picture tubes were washed with pure water to clean the particle surface. Then, a 10% $SiO_2$ solution was prepared by dissolving $SiO_2$ in a 10% aqueous solution of choline. Then, 5 wt. parts of the $SiO_2$ solution was added to 100 wt. parts of the phosphor particles and 100 wt. parts of pure water, and the resultant solution was fully stirred and dried at 100° C. to 150° C. until the water was removed thoroughly.

Subsequently, the resultant product was repeatedly washed with water until it was neutralized, thereby removing choline. Then, it was dried again and subjected to mesh-sieving, and thus obtained were phosphor particles with substantially uniform diameters, continuous $SiO_2$ films being formed on the surface of the particles.

Thus obtained particles were found to be coated with continuous $SiO_2$ films with a thickness of approximately 10 m$\mu$. The weight of these films are equivalent to 0.5% of that of the phosphor particles. Thus, as shown in Table 1, the luminance of the fluorescent screen of a color picture tube manufactured by the conventional method with use of these phosphor particles proved to be increased by 4% and 3% as compared with the values for the prior art phosphors treated with zinc silicate and $SiO_2$ powders, respectively. In Table 1, the luminance obtained with use of zinc silicate is given as 100%.

TABLE 1

| Surface Treatment | Luminance |
| --- | --- |
| Zinc silicate treatment | 100% |
| $SiO_2$ powder treatment | 101% |
| This invention | 104% |

EXAMPLE 2

Blue light emitting phosphor particles, Zns/Ag, available for color picture tubes were thoroughly washed with water to clean the particle surface. Then, 100 wt. parts of the phosphor particles and 1,000 wt. parts of pure water were placed in a container, and subjected to high-speed propeller stirring for about an hour, thereby fully dispersing the phosphor particles. Then, supernatant liquid was removed to adjust the ratio of the phosphor particles to the pure water to 100 wt. parts: 100 wt. parts, and 12.5 wt. parts of choline solution containing 10% of $SiO_2$ was added to the resultant slurry, and stirred. Thereafter, the solution was filtered until the percentage of water content became approximately 20%, and dried at a temperature of 100° C. to 150° C. After the dried phosphor particles were washed with water to adjust the pH value to 6.0–6.5, they were redried. Thus obtained phosphor particles were found to contain 0.25% (by weight) of continuous $SiO_2$ films, the thickness the films being approximately 5 m$\mu$.

The phosphor particles of this example were found to be higher in resistance to impurity pollution as compared with the prior art phosphor particles treated with zinc silicate or $SiO_2$ powders. In particular, the surface treatment process of this invention proved to have perfectly solved the problem of discoloration by copper that had conventionally been a weakness of the blue light emitting phosphor, ZnS/Ag.

When a fluorescent screen of a color picture tube was made by the conventional method with use of the phosphor particles of this example, the luminance obtained was found to be improved by approximately 2%, and no discoloration due to the impurity copper was noticed, as shown in Table 2.

TABLE 2

| Surface Treatment | Luminance |
| --- | --- |
| Zinc silicate treatment | 100% |
| This invention | 102% |

EXAMPLE 3

Red light emitting phosphor particles, $Y_2O_2S/Eu$, available for color picture tubes were thoroughly washed with water to clean the particle surface. Then, 100 wt. parts of the phosphor particles, 100 wt. parts of pure water, and 7 wt. parts of choline solution containing 10% of $SiO_2$ were mixed and stirred, and the resultant slurry was dried at 100° C. to 150° C. Then, the phosphor particles were stirred and dispersed in pure water, and the pH value is adjusted to 7.0 by using hydrochloric acid. Thereafter, the phosphor particles were washed with pure water 10 times to provide the ratio of the phosphor particles to the pure water at 100 wt. parts: 1,000 wt. parts, and dried.

Thus obtained phosphor particles were found to be coated with $SiO_2$ films with a thickness of approximately 13 m$\mu$. The weight of these films are equivalent to approximately 0.7% of that of the phosphor particles. Thus, as compared with the values for the prior art phosphor particles without surface treatment, the liquid-dispersibility of the phosphor particles of this example was improved, and the film luminance of a fluorescent screen of a color picture tube made by the conventional method was found to be increased by approximately 2%, as shown in Table 3. In Table 3, the luminance obtained with use of the prior art phosphor particles is given as 100%.

TABLE 3

| Surface Treatment | Luminance |
| --- | --- |
| None | 100% |

TABLE 3-continued

| Surface Treatment | Luminance |
| --- | --- |
| This invention | 102% |

EXAMPLE 4

Now there will be described a case where phosphor particles of calcium halo-phosphate available for fluorescent lamps for general illumination are coated by the method of this invention.

Phosphor particles of Sb, Mn-activated calcium halo-phosphate, which emit white light at 4,200° K., were thoroughly washed with water to clean the particle surface. 100 wt. parts of these phosphor particles and 1,000 wt. parts of pure water were placed in a container, and subjected to high-speed propeller stirring for about an hour, thereby fully dispersing the phosphor particles. Then, supernatant liquid was removed to adjust the ratio of the phosphor particles to the pure water to 100 wt. parts: 100 wt. parts, and 10 wt. parts of choline solution containing 10% of $SiO_2$ was added to the resultant solution, and stirred. Thereafter, the solution was filtered until the percentage of water content became approximately 20%, and dried at a temperature of 100° C. to 150° C. After the dried phosphor particles were washed with pure water to adjust the pH value to 6.0–6.5, they were subjected to filtering, redried, and passed through a 100-mesh sieve. Thus obtained phosphor particles were found to be coated with continuous $SiO_2$ films with a thickness of approximately 2 m$\mu$ and to contain about 0.1% (by weight) of $SiO_2$.

As compared with the prior art phosphor particles, the phosphor particles of this example proved to be improved in dispersibility and resistance to impurity pollution, eliminating the possibility of deterioration in luminance due to reaction to sodium from glass tubes for fluorescent lamps, in particular.

40 W white noiseless fluorescent lamps were manufactured by the conventional manufacturing method with use of the phosphor particles treated by the method of the invention and the prior art phosphor particles, and the initial total luminous flux ratio and luminous flux ratio after 3,000 hours of use were examined. In consequence, as shown in Table 4, the initial total luminous flux (lumen) ratio and the luminous flux ratio after 3,000 hours of use in the invention exhibited improvements of 2.0% and 4.3%, respectively, as compared with the values for the lamp using the prior art phosphor particles.

In Table 4, the values for the prior art phosphor particles are given as 100%.

TABLE 4

| Surface Treatment | Initial Total Luminous Flux Ratio | Luminous Flux Ratio After 3,000 Hrs. of Use |
| --- | --- | --- |
| None | 100.0% | 100.0% |
| This invention | 102.0% | 104.3% |

EXAMPLE 5

Phosphor particles, $Sr_2P_2O_7$/Sn were treated by the method of the invention including the same processes of Example 4, and thus prepared were phosphor particles coated with $SiO_2$ films with a thickness of approximately 5 m$\mu$. The $SiO_2$ films contain 0.25% (by weight) of $SiO_2$ relative to the phosphor particles. In order to compare the phosphor particles of this example with the prior art ones, 40 W noiseless fluorescent lamps were manufactured in the same manner as in Example 4, and the initial total luminous flux ratio and luminous flux ratio after 3,000 hours of use were examined. In consequence, as shown in Table 5, the initial total luminous flux ratio and the luminous flux ratio after 3,000 hours of use in the invention exhibited improvements of 3.2% and 4.0%, respectively, as compared with the values for the lamp using the prior art phosphor particles.

TABLE 5

| Surface Treatment | Initial Total Luminous Flux Ratio | Luminous Flux Ratio After 3,000 Hrs. of Use |
| --- | --- | --- |
| None | 100.0% | 100.0% |
| This invention | 103.2% | 104.0% |

The method of this invention may suitably be applied to e.g. ZnS/Cu, Al; (Zn, Cd)S/Cu, Al; Zn(S, Se)/Cu, etc. as the green light emitting phosphor for color picture tubes, and e.g. $Y_2O_3$/Eu as the red light emitting phosphor, besides the phosphors of the above-mentioned examples. As regards phosphors for illumination, e.g. a blue light emitting phosphor, $MgWO_4$, green light emitting phoshors, $Zn_2SiO_4$/Mn and $Y_2SiO_5$/Ce, Tb, and red light emitting phosphors, $YVO_4$/Eu and Y(V, P)$O_4$/Eu may be improved in luminous efficiency by the surface treatment of this invention.

What we claim is:

1. A method for surface treatment of phosphor particles consisting essentially of forming a continuous film of silicon dioxide on the surface of each phosphor particle by treating said phosphor particle with a solution containing an aqueous solution of organic alkali and silicon dioxide dissolved in said aqueous solution.

2. A method according to claim 1 or 3, wherein said organic alkali is a member selected from the group consisting of choline, tetramethylammonium hydroxide, tetraethylammonium hydroxide, tetrapropylammonium hydroxide, tetrabutylammonium hydroxide, tributylmonoethylammonium hydroxide, trimethylmonooctylammonium hydroxide, and triethylmonophenylammonium hydroxide.

3. A method of forming of thin continuous silicon dioxide film on the surface of a phosphor consisting essentially of the steps of:
   (a) dissolving silicon dioxide in an organic alkali solution to form a silicon dioxide-containing solution;
   (b) adding the silicon dioxide-containing solution of step (a) to phosphor particles thereby depositing solid silicon dioxide on the surfaces of said phosphors to form a thin continuous silicon dioxide film thereon, and thereafter
   (c) drying the resulting continuous silicon dioxide film-coated particles.

4. A method according to claim 1 or 3 wherein the resulting coating amounts to from 0.02 to 4% by weight of the weight of the phosphor particles.

5. A method according to claim 1 or 3 wherein the continuous silicon dioxide film has a thickness of from 0.5 to 70 m$\mu$.

6. A method according to claim 5 wherein the continuous silicon dioxide film has a thickness of from 1 to 40 m$\mu$.

* * * * *